(12) United States Patent
Williams et al.

(10) Patent No.: US 6,453,740 B1
(45) Date of Patent: Sep. 24, 2002

(54) FLUID LEVEL MEASURING DEVICE

(75) Inventors: Anthony J. Williams, North Canton, OH (US); Karen S. Hicks, Holmesville, OH (US); David A. Wiandt, Strasburg, OH (US); Daniel S. Justice, Millersburg, OH (US); Brian G. Shriber, Orrville, OH (US)

(73) Assignee: Felsted Products LLC, Moberly, MS (US)

( * ) Notice: Subject to any disclaimer, the term of this patent is extended or adjusted under 35 U.S.C. 154(b) by 0 days.

(21) Appl. No.: 09/947,314

(22) Filed: Sep. 7, 2001

Related U.S. Application Data

(63) Continuation of application No. 08/976,781, filed on Nov. 24, 1997, now Pat. No. 6,314,808, which is a continuation-in-part of application No. 08/607,690, filed on Feb. 27, 1996, now abandoned.

(51) Int. Cl.[7] ............................................. G01F 23/04
(52) U.S. Cl. ...................... 73/290 B; 184/105; 33/722
(58) Field of Search ...................... 73/290 B; 184/105; 33/722

(56) References Cited

U.S. PATENT DOCUMENTS

| | | |
|---|---|---|
| 1,781,534 A | 11/1930 | Bertschinger |
| D105,723 S | 8/1937 | Wheaton |
| 2,663,084 A | 12/1953 | Coderre |
| D201,327 S | 6/1965 | Hori et al. |
| D205,975 S | 10/1966 | Sato |
| 3,371,418 A | 3/1968 | Moeller |
| 3,626,596 A | 12/1971 | Manke |
| 3,703,038 A | 11/1972 | Smith |
| 3,722,102 A | 3/1973 | Jackson et al. |
| 3,913,783 A | 10/1975 | Cooper |
| 3,927,783 A | 12/1975 | Bogert |
| 3,991,476 A | 11/1976 | Haines |
| 4,055,898 A | 11/1977 | Braun et al. |
| 4,113,138 A | 9/1978 | Fields et al. |
| D250,467 S | 12/1978 | O'Banion |
| D250,468 S | 12/1978 | O'Banion |
| 4,155,166 A | 5/1979 | Rochow et al. |
| 4,168,011 A | 9/1979 | Lomer |
| D259,489 S | 6/1981 | Herenius |
| 4,331,185 A | 5/1982 | Rinaldo et al. |
| 4,368,579 A | 1/1983 | Bauer |
| D274,620 S | 7/1984 | Murakami et al. |
| 4,516,688 A | 5/1985 | Freeland |
| 4,531,293 A | 7/1985 | Grinde |
| 4,640,126 A | 2/1987 | Jansch |
| 4,717,119 A | 1/1988 | Trin |
| D305,028 S | 12/1989 | Sherwood et al. |
| 4,965,942 A | 10/1990 | Hoszowski |
| 4,991,436 A | 2/1991 | Roling |
| 5,022,495 A | 6/1991 | Lavender |
| D320,562 S | 10/1991 | Brester et al. |
| 5,086,943 A | 2/1992 | Poskie |
| 5,094,008 A | 3/1992 | Murphy et al. |
| D348,645 S | 7/1994 | Hitchcock et al. |
| 5,325,981 A | 7/1994 | Klomhaus et al. |
| 5,466,020 A | 11/1995 | Page et al. |
| 5,485,681 A | 1/1996 | Hitchcock |
| 5,613,303 A | 3/1997 | Kayano et al. |
| 5,829,153 A | 11/1998 | Hitchcock |

FOREIGN PATENT DOCUMENTS

FR        771315        6/1933

*Primary Examiner*—Daniel S. Larkin
*Assistant Examiner*—André K. Jackson
(74) *Attorney, Agent, or Firm*—Michael K. Boyer

(57) ABSTRACT

A fluid level measuring device, also referred to as a dipstick, for measuring the fluid level in a fluid reservoir or tank, such as an oil pan or transmission reservoir in an internal combustion engine. The fluid level measuring device includes a stationary tube assembly in which a dipstick assembly is disposed. The dipstick assembly includes a fluid level indicator measuring blade attached to an elongated shaft which is directly molded into a plastic handle assembly. The plastic handle assembly includes a bayonet type locking mechanism for locking the handle to the stationary tube assembly. A compressible seal forms a pressurized seal between the stationary tube assembly and the handle.

22 Claims, 2 Drawing Sheets

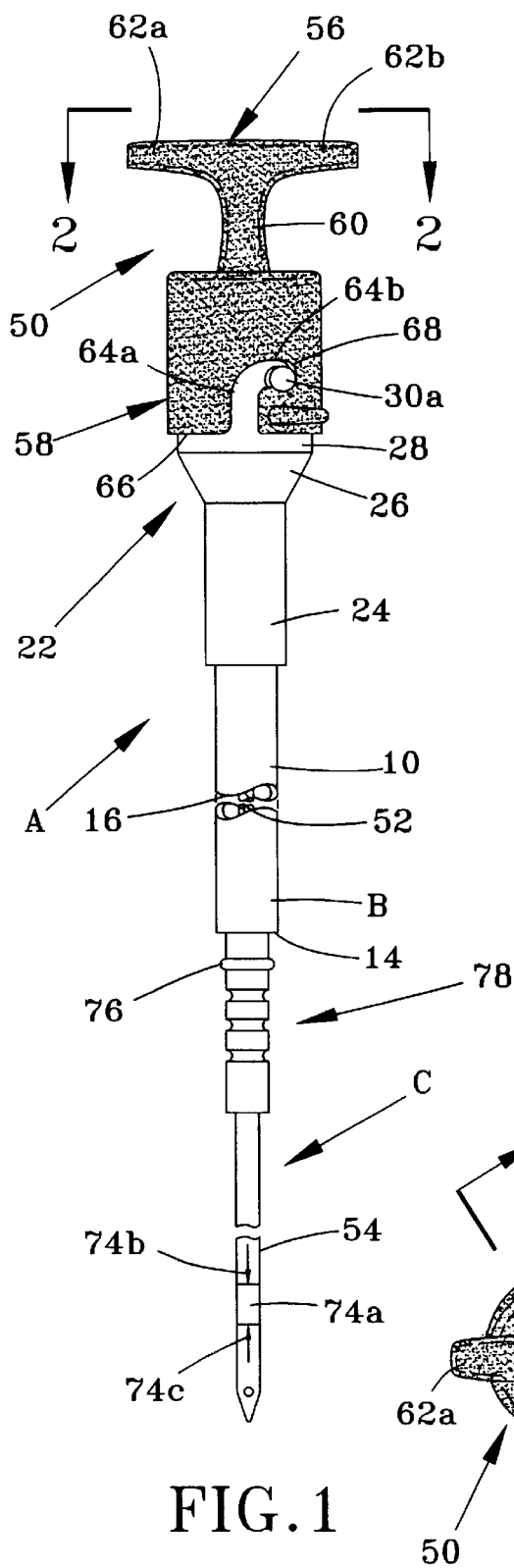
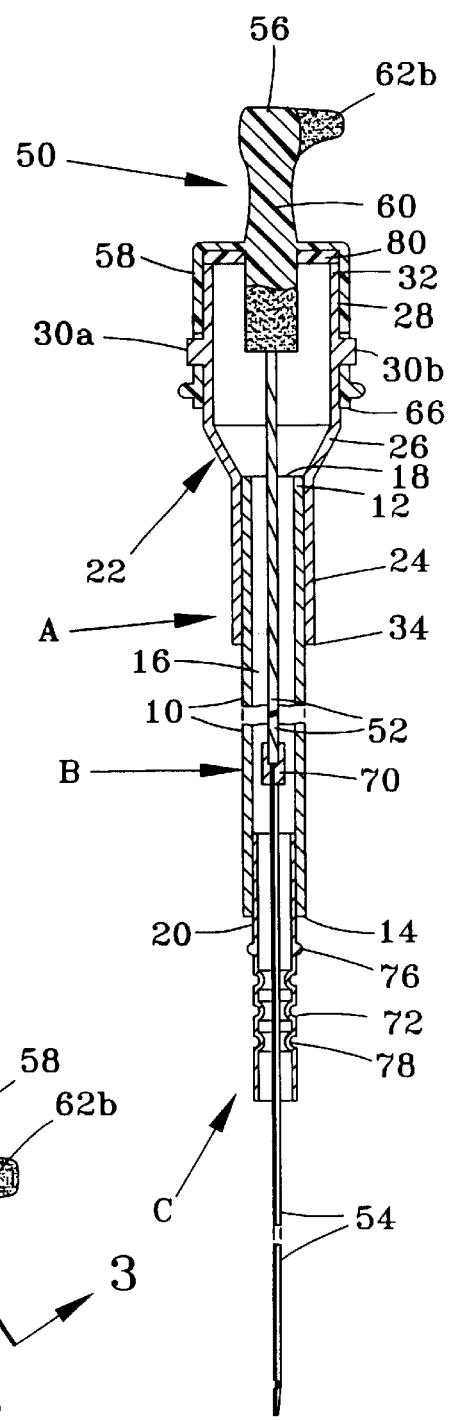
FIG.1  FIG.2  FIG.3

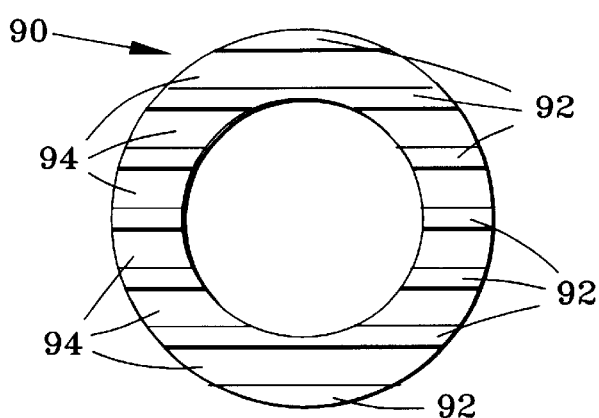
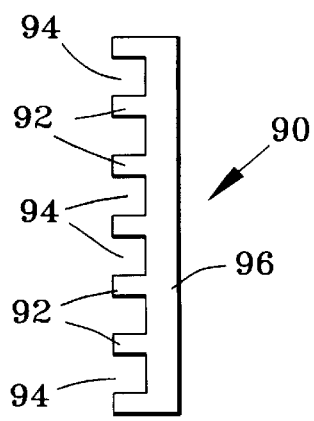
FIG.4  FIG.5
FIG.6
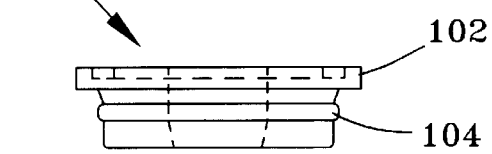
FIG.7
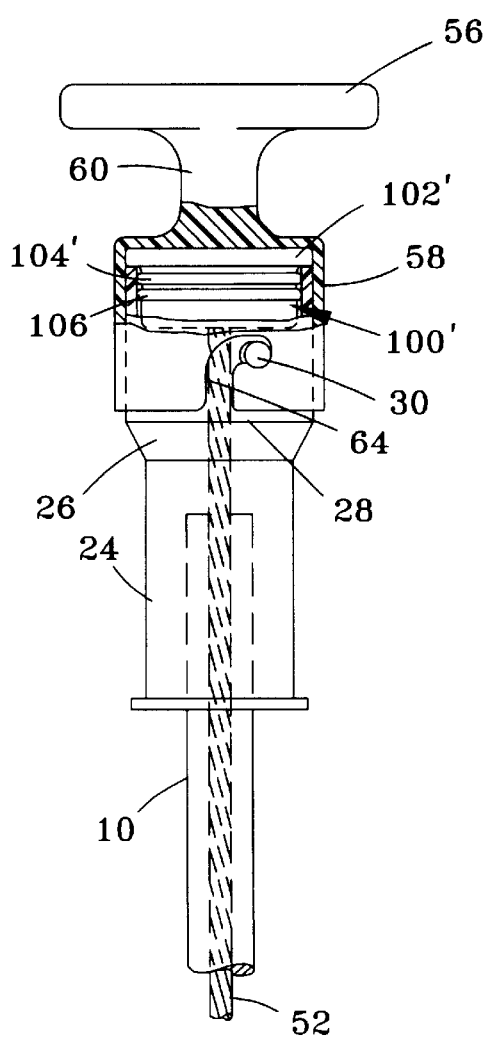
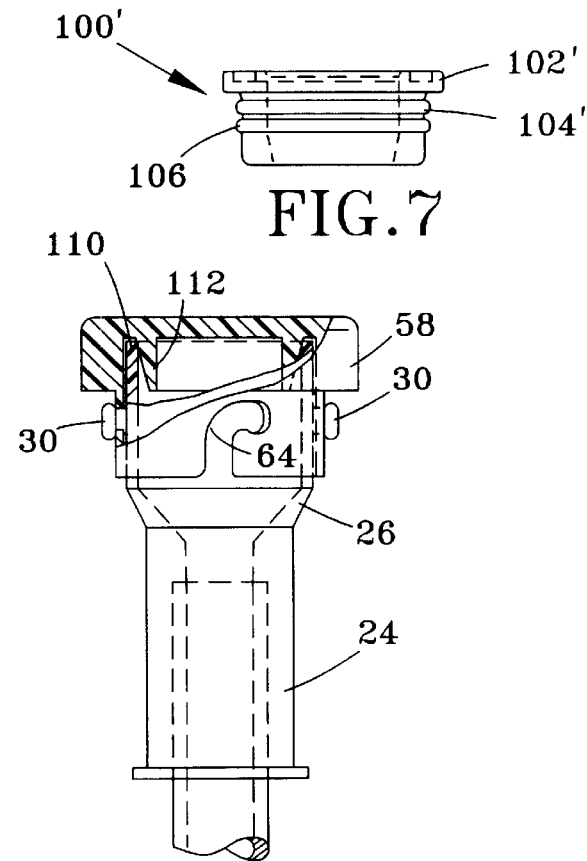
FIG.8  FIG.9

FLUID LEVEL MEASURING DEVICE

The subject matter herein is a continuation of previously filed U.S. patent application Ser. No. 08/976,781, filed Nov. 24, 1997, now U.S. Pat. No. 6,314,808 B1, which is a continuation in part of U.S. patent application Ser. No. 08/607,690, filed on Feb. 27, 1996, now abandoned.

BACKGROUND OF THE INVENTION

The subject invention is directed to a device used to measure fluid levels, and more particularly, to dipsticks used to measure fluid levels by immersing an indicator at one end of the dipstick into a fluid holding compartment.

With internal combustion engines, transmissions, and other machinery requiring fluids for lubrication and cooling, it is known to use a fluid measuring device for indicating the fluid level in a selected fluid holding compartment. Typically, the fluid measuring device is a dipstick for checking the level of fluid such as engine or transmission oil, or hydraulic fluid within one of the many fluid holding compartments in the engine, transmission, or other machine. The dipstick is normally an elongated indicator that is slidably located within a conduit or pipe attached to the engine, transmission, or machine in which a fluid level indication is desired. When the dipstick is fully inserted into the conduit, one end is immersed into the fluid. When an actual reading of the fluid level is desired, the other end of the dipstick is pulled from the conduit thereby removing the entire dipstick from the conduit to allow the user to read the fluid level from the one end. The dipstick is then reinserted into the fluid compartment once the fluid level has been checked.

Traditional fluid level indicator systems typically consist of a two piece system with a holding tube and a dipstick. The holding tubes are generally fabricated from metal tubing and require various forming operations including bending, flaring, and machining, followed by the attachment of a dipstick receptacle. In addition, the dipstick is fabricated from multiple components including a handle, washer, cap, rubber stopper, shaft assembly, and a marked spring steel shaft mechanically joined to a spring steel blade. The actual assembly of these various components involves multiple assembly operations requiring costly, time-consuming, and labor intensive manufacturing steps. Therefore, a simpler design requiring fewer parts and connections as well as less forming is desirable.

In addition, today's engines, transmissions, and machinery designs are smaller, more compact, and of less weight than traditional engines, transmissions, and machinery. Therefore, fluid level indicator systems must be smaller, more compact, and lighter weight. Moreover, the fluid access routes or paths through which the fluid level indicator system accesses the fluid storage compartments are becoming more complex (more twists and turns as well as longer runs), smaller, and more compact. The result is a need for smaller and lighter weight fluid level indicator systems with improved flexibility.

It is also desirable to provide a fluid level indicator system allowing access to the fluid compartment while assuring a secure, sealed closure of the access when fluid level determinations are not being made and/or additional fluid is not being added. This sealed closure would prevent unnecessary loss of the fluids during operation as well as supply level pressurization. Moreover, a positive indication that the dipstick is securely in place is desirable.

SUMMARY OF THE INVENTION

This invention represents an improvement over the presently-known dipsticks which measure fluid levels when immersed in a fluid compartment.

The fluid level measuring device includes a stationary tube assembly extending from the fluid compartment in which a dipstick is disposed. The dipstick includes a plastic handle that is directly joined or molded to one end of a flexible shaft, such as a spring steel wire shaft. A precision stamped fluid level indicator blade extends from a second end of the shaft and is preferably attached to the flexible shaft by either die casting, spin welding, ultrasonic welding, or other, bonding means, or by means of a fitting or other connector. The tube assembly is preferably made of a plastic material with an enlarged end. Lugs extend from the end and provide a bayonet interconnection between the tube and the handle assembly by twisting the handle assembly relative to the tube. This causes interengagement of the lugs with slots in the handle. A steel engine fitting extends from the tube and serves to guide the indicator blade to an appropriate location within the fluid cavity.

A gasket acts as a pressure lock seal for sealing the handle to the enlarged end when the lugs are locked in the slots. This pressure lock seal serves to allow significant pressurization within the dipstick and oil pan or other chamber the dipstick is affixed to.

The bayonet interconnection in unison with the gasket supplies an actual pressurized seal not found in any of the prior art assemblies, thereby allowing pressurized testing of the combustion engine, transmission, or other machinery without either removal of the dipstick or attempts at sealing the dipstick. Furthermore, a sealed dipstick allows the combustion engine, transmission, or other machinery to run at the intended pressure rather than either below the intended pressure or at the intended pressure due to an adjustment.

The structure is manufactured from lightweight, corrosion-resistant, plastic materials with the exception of the flexible metallic shaft, attachment fitting, blade, and metal engine fitting. The seal and locking engagement between the handle and enlarged end preferably involves a quarter-turn sealing motion with an improved sealing capability and a positive lock feature.

It is an object of the invention to provide a fluid level indicating system capable of being in fluid communication with the combustion engine, transmission, or other machinery to which it is affixed while maintaining a constant pressurization therein through an improved method of sealing. Specifically, a seal that is capable of maintaining several atmospheres (at least 1 to 1.5 atm.) of back pressure is desirable.

It is another object of the invention to provide a positive engaging, yet easy to use, locking arrangement for securely locking and sealing the dipstick within or over the tube with an easy motion. It is also desirable that this sealing of the dipstick within the tube is such that the tube may be pressurized to the same back pressure as the combustion engine, transmission, or other machinery.

It is still a further object of the invention to provide a smaller and more compact fluid level indicating system which has improved flexibility for routing of the fluid level indicator system in and around the complex design of today's engines, transmissions, and machinery.

In addition, it is yet another object of the invention to provide a more corrosion-resistant, lighter weight, less complex, higher precision and more cost effective fluid level indicator system.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is a side view of the fluid level measuring device including the stationary tube assembly with a dipstick inserted therein having a handle attached to one end thereof;

FIG. 2 is a top view of the fluid level measuring device;

FIG. 3 is a partial sectional view of the fluid measuring device of FIG. 1;

FIGS. 4 and 5 are front and side elevational views, respectively, of another preferred sealing gasket;

FIGS. 6 and 7 are elevational views of further preferred embodiments of grommet seals;

FIG. 8 is an elevational view, in partial cross-section, of the end of the dipstick assembly using the seal of FIG. 7 received on the tube assembly; and FIG. 9 is an elevational view of the end of the dipstick assembly incorporating yet another preferred grommet embodiment for sealing the end of the tube assembly.

DETAILED DESCRIPTION OF THE PREFERRED EMBODIMENT

Referring now to the drawings wherein the showings are for the purposes of illustrating the preferred embodiments of the invention only and not for purposes of limiting the invention, the overall arrangement of the preferred construction of the fluid level measuring device A can best be understood by reference to FIGS. 1 and 3. As illustrated therein, the fluid level measuring device A comprises a stationary tube assembly B with a dipstick assembly C removably disposed therein. Specifically, tube assembly B is an elongated, hollow guide tube 10 with first and second spaced ends 12 and 14 having a through passage 16 that communicates with first and second openings 18 and 20 at the respective first and second ends.

The tube assembly B further includes an enlarged diameter coupler or spout 22 attached to the first end 12 of the guide tube 10. In a preferred embodiment, the coupler is joined to the first end 12 of the guide tube as described herein. The coupler 22 has a small diameter portion 24, a flare or tapered transition portion 26, and a large diameter portion 28 at its second end. The small diameter portion is closely received over the guide tube first end. The large diameter portion includes a pair of outwardly extending lugs 30A and 30B that form a portion of a locking assembly to be described in greater detail below. The coupler is also hollow, defining a continuous internal cavity that extends from a first or upper end 32 to a second or lower end 34. The internal cavity is enlarged at the upper end to accommodate an interconnection between the shaft and a handle, and to provide an orifice for receiving a spout on a fluid container, such as an oil container. For example, the spout of a standard quart of oil will fit in this enlarged upper end. Alternatively, the enlarged upper end may be dimensioned to receive a different sized oil container. It will be appreciated, however, that the enlarged upper end will eliminate use of a funnel in many instances.

Dipstick assembly C includes a plastic molded handle assembly 50, an elongated relatively stiff, yet bendable shaft 52 such as the stranded wire rope, illustrated in the drawings, and a fluid level indicator blade 54. The handle 50 includes gripping portion 56 connected to a hollow cylindrical base 58 by a neck 60 of reduced dimension. The gripping portion preferably has a pair of knobs 62A and 62B extending outwardly and obliquely from the neck 60. The base 58, on the other hand, has a paid of slots 64A and 64B defined therein. In the preferred embodiment, each slot extends entirely through the base sidewall and is of a generally curvilinear conformation. The slots have an opening at one end along lower edge 66 of the base and a locking seat 68 at the other end of the curvilinear slot. Each of the curvilinear slots 64A and 64B is defined so as to have an axial portion aligned approximately with the shaft, and likewise the tube assembly B, and positioned adjacent the lower edge 66 of the base 58, and a generally transverse portion at the other end of the slots and in which locking seat 68 is defined.

The combination of slot 64A and 64B with lugs 30A and 30B defines a locking mechanism or bayonet type interconnection where lugs 30A and 30B slide in slots 64A and 64B. Axial insertion of the handle over the lugs and a quarter turn causes the handle base to slide over the coupler 22 whereby the lugs 30A and 30B become positively engaged in corresponding locking seats 68.

Shaft 52 is joined, bonded, molded, glued, or otherwise connected to handle assembly 50 to provide a secure interconnection that is not labor intensive to form. Fluid level indicator blade 54 is affixed to the other end of the shaft 52 by die casting (or alternatively, by a staked attachment fitting 70 or other suitable mechanical connection). The die cast construction eliminates tolerance stack-up problems associated with prior arrangements, reduces the number of components, and provides a smooth transition fitting that does not catch in the guide tube. The indicator blade 54 is typically rounded or pointed at its free end to allow for easy insertion into the coupler 22, through the guide tube 10, and through engine fitting 72. The indicator blade also includes indicia, such as shaded area 74A and arrows 74B and 74C on at least one of the faces of the blade, for indicating the fluid level when dipstick assembly C is inserted fully into stationary tube assembly B that extends from the engine fitting.

Engine fitting 72 is compression sealed or press fit within second opening 20 of the guide tube 10. Alternatively, the fit may be a tight seal, a threaded fitting, or other connector, or the fit may involve bonding, gluing, molding, or other means of sealably connecting. A lip 76 prevents engine fitting 72 from complete insertion into elongated guide tube 10. The opposite end of engine fitting 72 is attached or bonded to a fluid reservoir or tank, such as found in an internal combustion engine, where it is desirous to measure the fluid level within the reservoir. In one embodiment, this engine fitting is made of steel and has a serrated outer surface 78 (although alternatively, the outer surface may be roughened, knurled, or of other texture).

With the engine fitting 72 connected to a fluid reservoir and providing access for dipstick assembly C, the opposite end of stationary tube assembly B, i.e., the coupler 22, is secured at a convenient location remote from engine fitting 72. The elongated through passageway that connects coupler 22 and engine fitting 72 thereby provides access to the fluid in the reservoir via dipstick assembly C. Specifically, fluid level indicator blade 54 is inserted through the coupler, and guide tube 10 such that the free end of blade 54 is immersed into the fluid in the reservoir. It will be appreciated that since the shaft is bendable, the guide tube can adopt twists and turns along its route and, the dipstick assembly can accommodate the tortuous path. For the blade 54 to be fully inserted, handle 56 must engage and interlock with coupler 22 and lugs 30A and 30B extending therefrom. Specifically, lugs 30A and 30B align with the open end of slot 64A and 64B respectively, whereby the handle is further forced over the coupler 22 resulting in lugs 30A and 30B following the curvilinear shape of slots 64A and 64B until locked in locking seats 68. The result is the rotation by approximately 90° of the handle about the coupler 22 as lugs 30A and 30B move from the axial portion of the respective slots into the transverse portion and eventually the locking seat 68.

A seal 80 (FIG. 3) is located in the base of cavity 82, and preferably glued, bonded or otherwise affixedly seated within the cap. The seal provides a pressure lock seal when the dipstick assembly is fully received in the guide tube. This seal has sufficient elasticity to allow compression of the seal by the coupler 22. This bayonet type locking arrangement provides assurance that fluid level indicator blade 54 is properly positioned for accurate fluid level readings as well as providing a positive lock feature for assuring that handle 56 is locked to stationary tube assembly B. Moreover, the seal provides sufficient sealing capabilities to allow the engine, transmission, or other machinery to reach several atmospheres (preferably at least 1 to 1.5 atm.) of back pressure without leakage. In addition, when fully seated, the seal prohibits contaminants from entering into the fluid reservoir where system integrity and reliability would be jeopardized, and prohibits unnecessary fluid loss from the assembly.

In a preferred embodiment, the coupler 22 and guide tube 10 are fabricated from plastics while engine fitting 72 is manufactured of high heat tolerating metals or plastics. Handle 56 is preferably a molded component to or in which flexible shaft 52 is directly molded, joined, or otherwise connected. The handle is dimensioned to overlie or encompass the coupler or spout in its locked position to prevent contaminants from entering the guide tube. Moreover, the use of plastics reduces corrosive effects and provides an overall reduction in system weight. Yet another advantage of using plastic in forming a number of the components is that the system can be color-coded for ease of use by the customer. Blade 54 is fabricated from steel or other comparable metals or plastics and is attached to flexible shaft 52 by attachment fitting 70 as described above. It will be appreciated, however, that other suitable materials may be used without departing from the scope and intent of the subject invention.

FIGS. 4–5 illustrate another preferred embodiment of the subject invention. In this arrangement, a different configuration grommet 90 is shown. It, too is of annular construction and preferably includes a series of legs 92 disposed in generally parallel relation and extending across the entire width of the annular grommet. That is, the legs are separated by grooves 94 so that the legs extend outwardly a minor dimension on the order of approximately 0.10 inch. An opposite face of the grommet 96 has a general planar conformation and fits within the base of the cavity defined by the handle. Thus, as will be appreciated, the grommet may be adhesively secured or interference fit into the base of the handle and is adapted to engage against send 32 of the spout. The alternating legs and grooves on the face of the grommet that engages the end of the spout prevents a seal from being formed in this particular version, however, by forming the grommet from an elastomeric material such as neoprene, the positive locking capability described in association with the embodiment of FIGS. 1–3 is maintained. That is, the user encounters a positive lock feel as the lugs enter the locking seats in the end of the slots. The elastomeric nature of the grommet serves as an integral portion of the locking function as the lugs 30 extend through the grooves 64, 66 in the handle. Engagement is made between the handle and the end of the spout. The lugs then pass the over-center position in the groove and urge the handle outwardly while maintaining the compressed relationship and ensuring a locked condition between the handle and the guide tube.

FIGS. 6–8 illustrate yet another version of a seal 100 that provides all of the same features and benefits of those shown and described in the earlier embodiments. FIGS. 6 and 7 illustrate two similar grommet seals 100 so that like components will be referred to by like reference numerals with a primed suffix (') in FIG. 7. The grommet has an enlarged shoulder 102 at one end that is received in the base of the handle. The shoulder has an outer diameter sufficient to engage against the axial end of the spout and perform the combined sealing and locking function as described above. In addition, a seal is formed in a radial direction with the wall of the spout by providing a circumferentially continuous sealing bead 104 (FIG. 6) or pair of beads 104; 106 (FIG. 7). In these preferred arrangements, the sealing bead(s) is(are) integrally formed as a part of the grommet seal to reduce the number of components, eliminate additional assembly, and provide for an assembly that meets close tolerance specifications. Thus, as best illustrated in FIG. 8, once the handle is in the locked and sealed position, terminal end of the spout is sealed against shoulder 102. In addition, the seal beads 104, 106 engage the radial inner wall of the spout to provide an enhanced seal. In these embodiments, the seals form an interference fit with the handle. Thus, the enlarged shoulder 102 is dimensioned to form an interference fit in the base of the handle in addition to being sized for engagement with the terminal end of the spout. In substantially all other respects, these arrangements are identical to the embodiments described above.

FIG. 9 shows yet another preferred embodiment that provides both an effective seal and positive locking feature. Here, the grommet or seal 110 is integrally molded into the handle. The seal has an annular configuration that extends from the planar interior base of the handle. The seal is circumferentially continuous and has a tapered or flared radial outer face 112 that is dimensioned for sealing engagement with the spout. The tapered conformation serves the dual purpose of sealing the handle and spout, as well as providing the positive locking function described above. When the handle is in the fully locked position, the terminal end of the spout engages the integrally molded seal in the base of the cap in an axial direction and the tapered wall 112 sealingly engages the radial inner wall of the spout.

The invention has been described with reference to the preferred embodiment. Obviously, modifications and alterations will occur to others upon a reading and understanding of this specification. For example, although the described embodiments extensively use plastic as the preferred material of construction, it is understood that other materials can be used for selected components if so desired. Likewise, mere reversal of components that achieve substantially the same function and result are contemplated. For instance, the seal and locking features can be achieved by differently configured seals and/or lug and slot arrangements without departing from the present invention. It is intended to include all such modifications and alterations insofar as they come within the scope of the appended claims or the equivalents thereof.

Having thus described the invention, it is claimed:

1. An apparatus for measuring fluid levels in an associated fluid reservoir in an engine, transmission, or other machinery, said fluid level measuring apparatus comprising:

an elongated relatively stiff, yet bendable shaft having first and second spaced ends;

a stationary tube extending from the associated fluid reservoir having an open end for receiving the shaft therein; a fluid level indicator blade attached to the first end of the shaft and dimensioned for receipt through the stationary tube and into the reservoir for providing an indication of a fluid level;

a handle joined to the shaft;

a locking assembly received on the handle and the stationary tube for selectively locking the handle in a locked position to the stationary tube upon complete insertion of the shaft into the tube wherein the locking assembly includes a pair of slots in the handle that receive lugs extending from the stationary tube and the slots have an axial portion aligned with the direction of insertion of the shaft into the tube and a generally transverse portion requiring the handle to rotate to reach the locked position; and a compressible member interposed between the handle and the open end of the stationary end of the tube wherein the compressible member is adhesively secured to the handle and the compressible member is dimensioned to urge the handle toward the locked position and prevent inadvertent removal of the handle.

2. The apparatus of claim 1 wherein the compressible member is an elastomeric material that seals between the handle and the stationary tube.

3. The apparatus of claim 2 wherein the elastomeric seal further comprises a seal face that is dimensioned for receipt in the stationary tube and sealingly engaging an interior wall thereof.

4. The apparatus of claim 1 wherein the compressible member is dimensioned for an interference fit with the handle.

5. An apparatus for measuring fluid levels in an associated fluid reservoir in an engine, transmission, or other machinery, said fluid level measuring apparatus comprising:

an elongated shaft having first and second spaced ends;

a stationary tube extending from the associated fluid reservoir having an open end for receiving the shaft therein;

a fluid level indicator blade attached to the first end of the shaft and dimensioned for receipt through the stationary tube and into the reservoir for providing an indication of a fluid level;

a handle joined to the shaft;

a locking assembly received on the handle and the stationary tube for selectively locking the handle in a locked position to the stationary tube upon complete insertion of the shaft into the tube wherein the locking assembly includes a pair of slots in the handle that receive lugs extending from the stationary tube and the slots have an axial portion aligned with the direction of insertion of the shaft into the tube and a generally tranverse portion requiring the handle to rotate to reach the locked position; and a compressible member interposed between the handle and the open end of the stationary end of the tube wherein the compressible member includes a series of legs spaced by grooves extending outwardly therefrom for engagement with the open end of the stationary tube, and the compressible member is dimensioned to urge the handle toward the locked position and prevent inadvertent removal of the handle.

6. The apparatus of claim 5 wherein the compressible member is an elastomeric material that seals between the handle and the tube.

7. The apparatus of claim 6 wherein the elastomeric member includes a bead profile that seals against an inner wall of the stationary tube.

8. The apparatus of claim 7 wherein the bead profile includes first and second circumferentially continuous, spaced beads that seal against the inner wall of the stationary tube.

9. An apparatus for measuring fluid levels in an associated fluid reservoir in an engine, transmission, or other machinery, said fluid level measuring apparatus comprising:

an elongated shaft having first and second spaced ends;

a stationary tube extending from the associated fluid reservoir having an open end for receiving the shaft therein;

a fluid level indicator blade attached to the first end of the shaft and dimensioned for receipt through the stationary tube and into the reservoir for providing an indication of a fluid level;

a handle joined to the shaft;

a locking assembly received on the handle and the stationary tube for selectively locking the handle in a locked position to the stationary tube upon complete insertion of the shaft into the tube wherein the locking assembly includes a pair of slots in the handle that receive lugs extending from the stationary tube and the slots have an axial portion aligned with the direction of insertion of the shaft into the tube and a generally transverse portion requiring the handle to rotate to reach the locked position; and a compressible sealing member interposed between the handle and the open end of the stationary end of the tube wherein the compressible sealing member is adhesively secured to the handle and the member is dimensioned to urge the handle toward the locked position and prevent inadvertent removal of the handle and the sealing member further including a seal face for sealing against an inner wall of the stationary tube.

10. The apparatus of claim 9 wherein the sealing member is dimensioned for an interference fit within the handle.

11. A fluid level measuring apparatus comprising:

a shaft comprising first and second ends and wherein a fluid level indicator blade is attached to a first end of the shaft, a tube having a first end having a coupler with an open end for receiving at least one end of the shaft and wherein said coupler has at least one lug extending therefrom, and a second end having a fitting, which is compression sealed on the tube, that guides the blade within a fluid containing cavity, a handle associated with the second end of the shaft and having at least one curvilinear slot defined in the handle wherein one end of said slot is open and dimensioned to engage said lug and another end of said slot terminates in a locking seat, and;

a gasket that is located in and extends from the base of the handle to contact the end face of the coupler and an inner surface of the coupler and wherein said gasket seals the handle and tube when said lug engages said locking seat.

12. A fluid level measuring apparatus comprising:

a shaft comprising first and second ends and wherein a fluid level indicator blade is associated with the first end of the shaft, a tube having an open end for receiving at least one end of the shaft and wherein said tube has at least one lug extending therefrom, and a second end having a fitting, which is press fit onto the tube, for engaging a fluid reservoir, a handle associated with the second end of the shaft and having at least one nonlinear slot defined in the handle wherein one end of said slot is open and dimensioned to engage said lug, and;

a compressible elastomeric member that extends from the base of the handle and contacts the end of the tube.

13. An apparatus comprising:

a tube having a first end associated with a coupler that has an open end and wherein said coupler has at least one lug extending therefrom, and a second end having a fitting that engages a fluid reservoir access, a handle having at least one curvilinear slot defined in the handle wherein one end of said at least one slot is open and dimensioned to engage said at least one lug and another end of said at least one slot terminates in a least one locking seat, and;

a compressible elastomeric member that extends from the base of the handle to contact the end face of the coupler and wherein said member urges the handle and tube into a locked position when said at least one lug engages said at least one locking seat.

14. A fluid level measuring apparatus comprising:

a shaft comprising first and second ends and wherein a fluid level indicator blade is associated with a first end of the shaft, a tube having a first end having a coupler with an open end for receiving at least one end of the shaft and wherein said coupler has at least one lug, and a second end having a fitting, which is connected to the tube, that guides the blade within a fluid containing cavity, a handle associated with the second end of the shaft and having at least one curvilinear slot defined in the handle wherein one end of said slot is open and dimensioned to engage said lug and another end of said slot terminates in a locking seat, and;

a gasket affixed to the handle that engages the coupler when said lug engages said locking seat and wherein said gasket urges the handle into a locked position when said at least one lug engages said at least one locking seat.

15. An apparatus comprising:

a tube comprising a first end joined to a coupler that has an open end and wherein said coupler has at least one lug, and a second end comprising a fitting that engages a fluid reservoir, a handle comprising at least one curvilinear slot defined in the handle wherein one end of said at least one slot is open and dimensioned to engage said at least one lug and another end of said at least one slot terminates in at least one locking seat, a shaft connected to the handle wherein said shaft is associated with a fluid level indicator blade and;

a compressible gasket member affixed to the handle wherein said member engages said coupler and urges the handle and tube into a locked position when said at least one lug engages said at least one locking seat.

16. An apparatus comprising:

a tube comprising a first end joined to a coupler that has an open end and wherein said coupler has at least one lug, and a second end comprising a fitting that engages a fluid reservoir, a handle comprising at least one curvilinear slot defined in the handle wherein one end of said at least one slot is open and dimensioned to engage said at least one lug and another end of said at least one slot terminates in at least one locking seat and wherein said at least one slot comprises an axial portion aligned generally with the direction of insertion of the shaft into the tube and a generally transverse portion, a shaft connected to the handle wherein said shaft is associated with a fluid level indicator blade and;

a compressible gasket member affixed to the handle for engaging the coupler.

17. The apparatus of claim 16 wherein said compressible gasket member provides a seal between said handle and coupler.

18. The apparatus of claim 16 wherein said compressible gasket member prevents a seal between said handle and coupler.

19. The apparatus of claim 16 wherein said at least one lug extends outwardly from the coupler.

20. The apparatus of claim 16 wherein said handle is dimensioned to enclose said coupler.

21. The apparatus of claim 16 wherein the compressible gasket member is affixed within a cavity defined within the base of the handle.

22. The apparatus of claim 16 wherein the compressible gasket member engages an axial end of the coupler.

* * * * *